US008755509B2

(12) United States Patent
Burt

(10) Patent No.: US 8,755,509 B2
(45) Date of Patent: Jun. 17, 2014

(54) TELECONFERENCING SYSTEM FOR ALLOWING LARGE NUMBERS OF CALLERS BY TRANSFERRING CALLERS TO CONNECTED SERVERS IN A CALL BRIDGE

(76) Inventor: Brian D Burt, Oakland, CA (US)

(*) Notice: Subject to any disclaimer, the term of this patent is extended or adjusted under 35 U.S.C. 154(b) by 0 days.

(21) Appl. No.: 13/064,854

(22) Filed: Apr. 21, 2011

(65) Prior Publication Data

US 2011/0261939 A1  Oct. 27, 2011

Related U.S. Application Data

(60) Provisional application No. 61/343,113, filed on Apr. 22, 2010, provisional application No. 61/343,112, filed on Apr. 22, 2010, provisional application No. 61/343,108, filed on Apr. 22, 2010, provisional application No. 61/343,107, filed on Apr. 22, 2010, provisional application No. 61/343,106, filed on Apr. 22, 2010, provisional application No. 61/343,105, filed on Apr. 22, 2010, provisional application No. 61/343,104, filed on Apr. 22, 2010.

(51) Int. Cl.
*H04M 3/42*  (2006.01)
(52) U.S. Cl.
USPC .............. 379/203.01; 379/158; 379/212.01; 370/260

(58) Field of Classification Search
USPC ............. 379/158, 202.01, 203.01, 205.01, 379/212.01, 204.01; 370/260, 261, 263
See application file for complete search history.

(56) References Cited

U.S. PATENT DOCUMENTS

| | | | |
|---|---|---|---|
| 6,636,887 B1* | 10/2003 | Augeri | 709/203 |
| 8,406,405 B2* | 3/2013 | Burt | 379/202.01 |
| 8,559,609 B2* | 10/2013 | Burt | 379/158 |
| 2003/0046344 A1* | 3/2003 | Kumhyr et al. | 709/205 |
| 2003/0158900 A1* | 8/2003 | Santos | 709/205 |
| 2006/0291637 A1* | 12/2006 | Erickson | 379/202.01 |
| 2011/0072087 A1* | 3/2011 | Cheung et al. | 709/205 |
| 2011/0075820 A1* | 3/2011 | Mikan et al. | 379/88.13 |
| 2011/0261938 A1* | 10/2011 | Burt | 379/158 |
| 2011/0261940 A1* | 10/2011 | Burt | 379/158 |
| 2011/0261944 A1* | 10/2011 | Burt | 379/204.01 |

* cited by examiner

*Primary Examiner* — Binh Tieu

(57) ABSTRACT

A teleconferencing system based on application software run on a primary server that establishes a teleconference involving a plurality of callers and at least one facilitator. The teleconferencing system enables transferring callers from the primary server to connected secondary servers, each of which is connected to the primary server, thereby enabling the size of the teleconference to scale either upon initiation of or during the teleconference. Callers may be transferred to secondary servers, and secondary servers may be added or removed from the teleconferencing system during a teleconference. The inventive teleconferencing system enables an almost unlimited number of callers to participate in a teleconference.

11 Claims, 3 Drawing Sheets

TELECONFERENCING SYSTEM FOR ALLOWING LARGE NUMBERS OF CALLERS BY TRANSFERRING CALLERS TO CONNECTED SERVERS IN A CALL BRIDGE

CROSS-REFERENCE TO RELATED APPLICATIONS

This application claims the benefits of the following U.S. Provisional Applications: "Teleconferencing system for allowing one touch transfer from a facilitator led discussion, Provisional Application No. 61/343,113, filed Apr. 22, 2010; "Teleconferencing system for allowing interchange between facilitator led discussions and reporting information about selected callers, Provisional Application No. 61/343,112, filed Apr. 22, 2010; "Teleconferencing system for allowing one touch queuing by callers in a facilitator led discussion," Provisional Application No. 61/343,108, filed Apr. 22, 2010; "Teleconferencing system for allowing large numbers of callers by transferring callers to connected servers in a call bridge," Provisional Application No. 61/343,107, filed Apr. 22, 2010; "Teleconferencing system for allowing the breaking out of groups of callers into sub-teleconferences and the reporting of callers speaking in the sub-teleconferences," Provisional Application No. 61/343,106, filed Apr. 22, 2010; "Teleconferencing system for allowing interchange in facilitator led discussions and sending information to callers electing to receive the information," Provisional Application No. 61/343,105, filed Apr. 22, 2010; "Teleconferencing system for allowing interchange between facilitator led discussions in a main conference and breaking out groups into sub-conferences," Provisional Application No. 61/343,104, filed Apr. 22, 2010.

FIELD OF THE INVENTION

The presently disclosed subject matter is directed towards a call-bridge teleconferencing system that enables callers in a facilitator-led teleconference to be transferred from a primary server to a secondary server when the capacity of the first server is approached, and such that the facilitator simultaneously conducts a teleconference with all callers.

BACKGROUND OF THE INVENTION

A very common way to hold a meeting and to perform group activities with widely dispersed people is teleconferencing. Teleconferencing is highly useful because it allows callers from around the world to participate in the same meeting at low cost.

Teleconferencing has been so successful that user needs have resulted in the development of modern teleconferencing "bridge systems" that allow callers to either dial into or log onto a computerized system that establishes a virtual teleconference. In such systems callers usually have to identify themselves, their access rights are checked, a facilitator is established, and operating rules are set and enforced by the bridge system.

Teleconferencing and the newer bridge systems generally support modern trends in education, business, and other group activities which focus on increasing the number and quality of interactions. For example, modern trends in education lean away from strictly lecture driven modalities and focus more on greater individual participation. In practice teleconferencing participants are often looked at as resources of an organization and as such the desire to incorporate those participants in decision-making at all levels has increased. This becomes a major problem as the geographic diversity of organizations and their participant's increases and as the need for better communications, such as teleconferencing, becomes even more critical. In fact, modern trends have placed such additional burdens on teleconferencing systems that even the newer "bridge teleconferencing systems" are often deemed insufficient.

The result of the foregoing is that more and more programs, be they sales, educational, marketing, or simply group meetings are being delivered and conducted via teleconferencing systems. Teleconferencing reduces costs, makes more efficient use of time, and makes a given meeting available to a greater segment of the population, including home or bedridden individuals.

While generally successful, call-bridge teleconference systems have a maximum capacity or number of callers that can participate in a teleconference. This presents a significant problem given the popularity and increasing use of call-bridge teleconferencing systems. A major reason that prior art call-bridge teleconference systems have rather limited capacity is that such systems can only handle the number of callers that a server that supports a call-bridge teleconference system can handle. That is, call-bridge systems have been server-limited.

Therefore, a call-bridge teleconference system that is not limited by the capacity of a single server would be beneficial. Even more beneficial would be a call-bridge teleconference system that enables facilitator-led teleconferencing over a plurality of servers. Still more beneficial would be a call-bridge teleconference system that enables facilitator-led teleconferencing such that when the capacity of a first server is approached callers are transferred to other servers and in such a way that a single facilitator-led teleconference is formed with all callers.

BRIEF SUMMARY OF THE INVENTION

It is an object of the invention to provide a teleconferencing system which enables the size of the teleconference to scale to a substantially unlimited size upon initiation of or during a teleconference.

It is another object of the invention to provide a teleconferencing system which automatically transfers callers to a secondary server upon a primary server approaching capacity wherein the primary and secondary servers are connected to form a call bridge.

It is a further object of the invention to provide a teleconferencing system which automatically adds additional secondary servers, and callers to those added secondary servers, to a connected secondary server when the overall system approaches capacity, thereby allowing for a substantially unlimited number of callers in a single teleconference.

The principles of the present invention provide for teleconferencing systems based on application software that runs on a primary server and that establishes a teleconference involving a plurality of callers and a facilitator. The teleconferencing system enables transferring teleconferencing callers from the primary server to secondary servers which connect to the primary server, thereby enabling the size of the teleconference to scale. Callers on both the primary and secondary servers can at least receive communications from the facilitator. The teleconference may scale in size either upon initiation of or during a teleconference. Callers may be transferred to secondary servers, and secondary servers may be added or removed from the teleconferencing system during a teleconference. Beneficially secondary servers can be added to secondary servers are required to expand system capacity. Thus, the teleconferencing system enables an almost unlimited number of callers to participate in a teleconference.

To the accomplishment of the above and related objects, the invention may be embodied in the form illustrated in the accompanying drawings. Attention is called to the fact, however, that the drawings are illustrative only. Variations are contemplated as being in accord with the principles of the present invention, therefore the present invention shall be construed as being limited only by the broad scope of the appended claims.

BRIEF DESCRIPTION OF THE DRAWINGS

The advantages and features of the present invention will become better understood with reference to the following detailed description and claims when taken in conjunction with the accompanying drawings, in which like elements are identified with like symbols, and in which:

DETAILED DESCRIPTION OF THE INVENTION

The presently disclosed subject matter will now be described more fully hereinafter with reference to the accompanying drawings in which one embodiment is shown. However, it should be understood that this invention may take many different forms and thus should not be construed as being limited to the embodiment set forth herein. In the figures, like numbers refer to like elements throughout.

Figure 1:
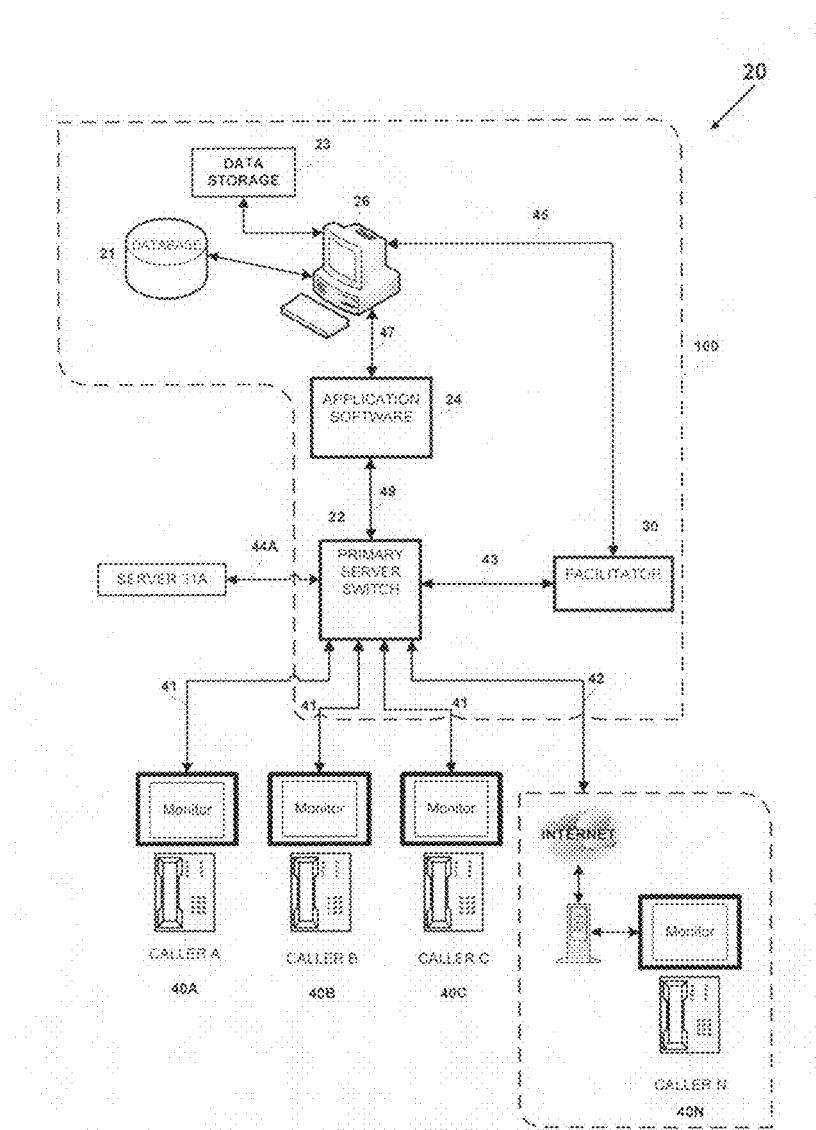
FIG. 1 is a diagrammatic representation of the various stations that comprise an interactive teleconferencing system that is in accord with the principles of the present invention, and in which all callers are connected to a primary server and one unused secondary server is also connected to the primary server.

FIG. 1 illustrates a teleconferencing system 20 that runs in accord with application software 24 located on a primary server 100. The teleconferencing system 20 includes a primary server switch 22 which is central to the overall operation of the teleconferencing system 20. The teleconferencing system 20 enables a facilitator 30 to dynamically cause the switch 22 to selectively interconnect a plurality of callers, shown as callers 40A, 40B, 40C, and 40N and the facilitator 30 into a teleconference. As shown in FIG. 1 the switch 22 also connects to an secondary server 31A. In FIG. 1 the secondary server 31A acts as an unused teleconferencing back-up server.

The callers 40A, 40B, 40C, and 40N, the facilitator 30, and the secondary server 31A connect to the teleconferencing system 20 using any of an assortment of communication mediums such as telephone lines 41 (as with callers 40A-40C), internet connections 42 (as with caller 40N), and data lines 43 (as with the facilitator 30) and data line 44A with the secondary server 31A. Of course the teleconferencing system 20 is also contemplated as working with other communication mediums, such as microwave or radio communications.

Hardware and firmware suitable for implementing the switch 22 are well known in the art. The switch 22 can be a hardware device or it can be a combination of hardware and software. For example, when used under the control of specific application software 24 an open source software solution such as FreeSwitch, distributed at freeswitch.org, can control hardware that is currently available within existing telecommunication networks to provide the required functionality described herein.

Still referring to FIG. 1, it is contemplated that the switch 22 operates under the control of the application software 24, which is comprised of code written to enable both basic teleconferencing functions and to provide the specific functionality to implement the principles of the present invention. The application software 24 might run as part of the switch 22, or it might be applied to the switch 22 by way of a data control port 49 and/or a secondary port 47 from a computer system 26. Preferably the application software 24 runs under the control of a computer system 26. The computer system 26 beneficially provides a user interface that enables, via a manual interface 45, control of the computer system 26, the application software 24, and the switch 22 as required to implement the various features of the teleconferencing system 20.

Preferably, the computer system 26 implements a user interface having a web-based, GUI (Graphic User Interface) display which allows easy control of the functions of the teleconferencing system 20. It should be noted that the teleconferencing system 20 generally operates at the behest of a facilitator 30, a person or group that leads the teleconference and controls, by way of the manual interface 45, the computer system 26, the application software 24, and the switch 22.

The purpose of the teleconferencing system 20 is to allow interactive teleconferencing between the callers, including caller 40A, caller 40B, caller 40C, caller 40N and the facilitator 30. To assist the facilitator 30 to establish and run the teleconference the teleconferencing system 20 provides the facilitator 30 with access to a database 21 that can be stored in data storage 23, which will typically be part of the computer system 26. Information in the database can be accessed by the facilitator 30 and/or application software 24 as required to implement to run a teleconference and to implement the principles of the present invention. For example, the facilitator 30 might be provided with caller information on a graphical user interface about each caller in the teleconference.

A problem that is addressed by the teleconferencing system 20 relates to the limited capacity of the primary server 100. For example, the primary server 100 might be able to handle X numbers of callers in a teleconference. In the prior art as the number of callers approaches or exceeds X the call-bridge teleconferencing system would fail. However, with the teleconferencing system 20 as the number of callers approaches X the teleconferencing system 20 begins transferring callers to the secondary server 31A while still supporting the teleconference being run by the facilitator 30. In addition, the teleconferencing system 20 is fully scalable in that additional secondary servers can be added to the teleconferencing system 20 as required.

Figure 2:
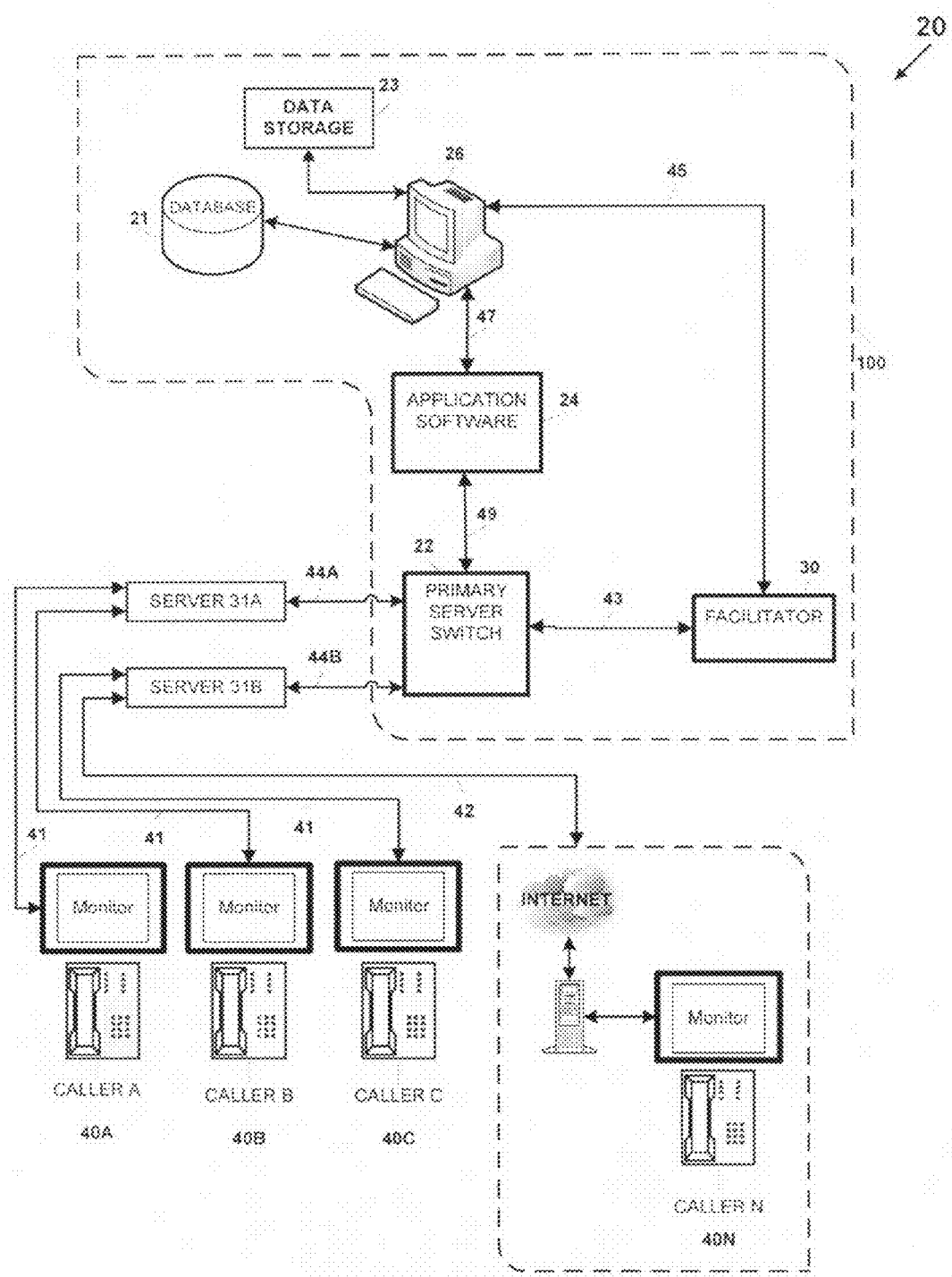
FIG. 2 is a diagrammatic representation of the interactive teleconferencing system of FIG. 1 after the addition of another secondary server and after callers have been transferred from the primary server to the secondary servers.

FIG. 2 illustrates the teleconferencing system 20 after it has reconfigured to add an additional secondary server, the secondary servers 31B, which connects to the switch 22 via a data line 44B, and after callers have been transferred to the secondary servers 31A and 31B. In particular, callers 40A and 40B have been switched to server 31A while callers 40C and 40N have been switched to server 31B. The number of additional secondary servers may be increased and decreased at the initiation of and/or during a teleconference. In some embodiments some callers will remain connected to the primary server 100.

FIG. 2 shows the callers 40A-40N after being transferred from the primary server 100 and after establishing line connections (41 and 42) to the secondary servers. This frees incoming lines to the primary server 100. In practice, all or just several of the callers may be transferred to a secondary server. However, it is beneficial if each additional secondary server has at least two callers transferred thereto so as to reduce the number of line connections to the primary server 100 by at least one connection. By adding additional secondary servers as required the teleconferencing system 20 can be scaled to most any size.

In the event that the switch 22 approaches its maximum capacity when handling only secondary servers, more servers can be added to the existing secondary servers as required to served the additional callers. This can assist scaling and increases the capacity of the teleconferencing system 20 to almost any number of callers.

As noted the facilitator 30 conducts the teleconference. The teleconferencing system 20 enables each caller, including those connected to secondary servers, to at least receive information from the facilitator 30. In at least one embodiment, each caller is enabled to have bi-direction communications with the facilitator 30.

Figure 3:
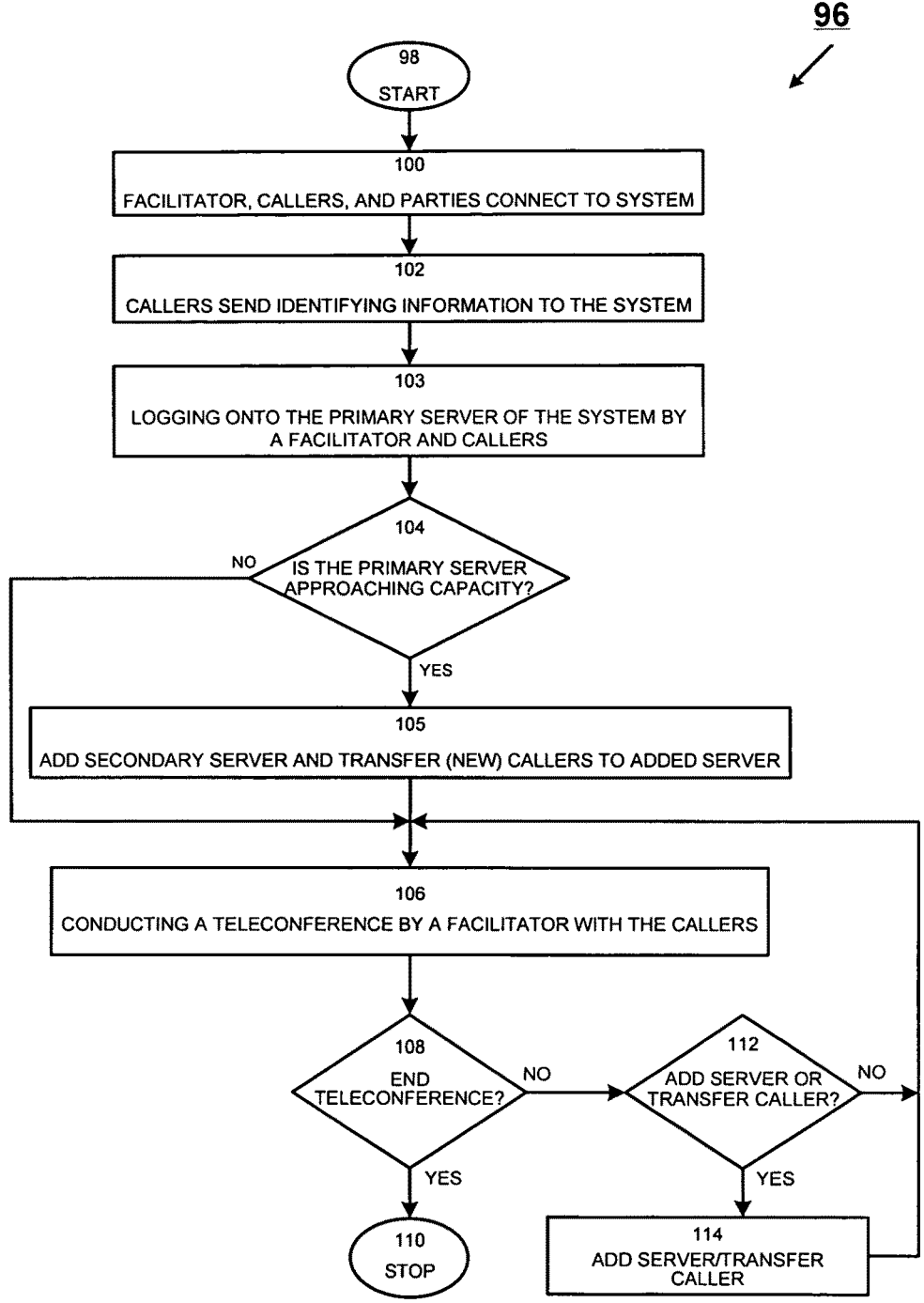
FIG. 3 is a flow chart illustrating the operation of a teleconferencing system in accord with the principles of the present invention.

The operation 96 of the teleconferencing system 20 is explained with the assistance of FIG. 3. The operation 96 starts at step 98 with an attempt to open a teleconference. The facilitator 30 and the callers (40A, 40B, 40C, 40N) first connect to the teleconferencing system 20, step 100. The callers 40A, 40B, 40C, 40N send identifying information to the teleconferencing system 20, step 102 and the teleconferencing system 20 logs the callers into the primary server 100, step 103. User accounts may have been established prior to step 100 or a user account may be set up at step 102.

A primary purpose of the teleconferencing system 20 is to enable scaling of the teleconferencing system 20. To that end the primary server 100 maintains a count of the number of callers logging into the primary server 100 and compares that count to the maximum capacity of the primary server 100. A determination is then made as to whether the primary server 100 is approaching its maximum capacity, step 104. If it is, a secondary server (such as secondary server 31B) is connected to the primary server and new callers, and possible some existing callers are transferred from the primary server 100 to the added secondary server, step 105. The primary server 100 now maintains a count of the number of callers logging into both itself and the secondary server.

After step 105, or if the primary server 100 is not approaching its capacity (see step 104), the teleconferencing system 20 proceeds with the facilitator 30 conducting a teleconference, step 106. During this time the facilitator 30 decides whether to end the teleconference, step 108. If the teleconference ends the operation 96 stops, step 110. However, if the teleconference continues (step 108 is No), the teleconferencing system 20 monitors the number of callers in the teleconference, both those connected to the primary server and to the secondary server (such as secondary server 31B) and determines whether to add another server and/or transfer callers, step 112. If the teleconferencing system 20 determines that it does not need another secondary server and that it does not need to transfer a caller the operation 96 returns to step 106 and the teleconference continues. If teleconferencing system 20 determines that it needs another secondary server or needs to transfer a caller the operation 96 proceeds by adding a secondary server or transferring one or more callers, step 114. The operation 96 then returns to step 106 and the teleconference continues.

A useful variation of the foregoing is to add servers to secondary servers as previously mentioned. Such would be performed during steps 112 and 114.

In conclusion, herein is presented a teleconferencing system which enables fully scalable facilitator-led teleconferencing systems. The teleconferencing system uses application software run on a primary server which establishes a teleconference involving a plurality of callers and at least one facilitator. The teleconferencing system enables transferring callers from the primary server to secondary servers, each of which is connected to the primary server, thereby enabling the size of the teleconference to scale. The callers on the primary and secondary servers can at least receive communications from the facilitator and in some configurations may also communicate with other callers in the teleconference. Callers may be transferred to secondary servers, secondary servers can be added to secondary servers if required, and servers may be added or removed from the teleconferencing system during a teleconference.

Therefore, it is to be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

What is claimed:

1. A teleconferencing system, comprising;
a primary server and a secondary server;
a computer system operating on said primary server;
a switch on said primary server for interconnecting a plurality of callers and a first facilitator on said primary server using at least one communication medium, said switch operatively connected to said secondary server; and
application software running on said primary server and controlled by said computer system, said application software for controlling said switch and for monitoring the number of callers connected to said primary server;
wherein said application software can cause said switch to use said communication medium to interconnect said plurality of callers and said first facilitator into a teleconference; and
wherein said application software can selectively cause said switch to transfer a caller from said primary server to said secondary server.

2. A teleconferencing system according to claim 1, wherein said teleconference includes callers transferred to said secondary server.

3. A teleconferencing system according to claim 1, wherein said transfer depends on the number of callers connected to said primary server.

4. A teleconferencing system according to claim 3, wherein said application software automatically transfers callers to said secondary server based on the number of callers connected to said primary server.

5. A teleconferencing system according to claim 1, wherein said computer system includes a user interface to inform said facilitator that a caller has been transferred.

6. A teleconferencing system according to claim 5, wherein a transfer of at least one caller of said plurality of callers is performed at the direction of said facilitator.

7. A teleconferencing system according to claim 6, wherein said application software can cause said computer system to retrieve information about said at least one caller from a database.

8. A teleconferencing system according to claim 5, wherein said transfer of at least one caller is initiated by said facilitator using a manual interface.

9. A teleconferencing system, comprising;
a primary server, a first secondary server, and a second secondary server;
a computer system operating on said primary server;
a switch on said primary server for interconnecting a plurality of callers and a first facilitator on said primary server using at least one communication medium, said switch operatively connected to said secondary server; and
application software running on said primary server and controlled by said computer system, said application software for controlling said switch and for monitoring the number of callers of said plurality of callers connected to said primary server, said first secondary server, and said second secondary server;
wherein said application software can cause said switch to use said communication medium to interconnect said plurality of callers and said first facilitator into a teleconference; and
wherein said application software can selectively cause said switch to transfer callers from said primary server to said first secondary server and to said second secondary server.

10. A teleconferencing system according to claim 9, wherein said second secondary server is connected to said first secondary server but not to said primary server.

11. A teleconferencing system according to claim 10, wherein callers connected to said primary server, to said first secondary server, and to said second secondary server all participate in the same teleconference.

* * * * *